United States Patent
Fertig

[15] 3,666,285
[45] May 30, 1972

[54] AUXILIARY MOVEMENT MEANS FOR HAND TRUCKS

[72] Inventor: William J. Fertig, 6144 Woodfox Court, Indianapolis, Ind. 46226

[22] Filed: June 5, 1970

[21] Appl. No.: 43,686

[52] U.S. Cl..............................280/47.12, 188/22, 214/370, 280/47.2, 280/47.27, 280/150 A
[51] Int. Cl..............................................B62b 1/04
[58] Field of Search..............280/47.11, 47.12, 47.17, 47.2, 280/47.24, 47.27, 47.28, 47.29, 47.33, 150 A; 188/21, 22, 23, 74; 214/370

[56] References Cited

UNITED STATES PATENTS

| 627,284 | 6/1899 | Walker | 188/22 X |
|---|---|---|---|
| 2,606,770 | 8/1952 | Reichert | 280/47.2 UX |
| 2,721,668 | 10/1955 | Elsner | 280/47.27 UX |
| 2,800,336 | 7/1957 | Major et al. | 280/47.11 |
| 3,486,587 | 12/1969 | Malloy | 188/22 |

FOREIGN PATENTS OR APPLICATIONS

| 141,265 | 5/1951 | Australia | 280/47.2 |
| 663,706 | 12/1951 | Great Britain | 280/47.2 |

Primary Examiner—Benjamin Hersh
Assistant Examiner—Leslie J. Paperner
Attorney—Robert A. Spray

[57] ABSTRACT

An auxiliary movement means for two-wheeled hand truck, which advantageously provides that truck may be conveniently moved in a lateral direction, that is, transversely to the usual path of the hand truck.

8 Claims, 4 Drawing Figures

PATENTED MAY 30 1972  3,666,285

WILLIAM J. FERTIG,
INVENTOR.

BY Robert A. Spray

ATTORNEY

AUXILIARY MOVEMENT MEANS FOR HAND TRUCKS

This invention relates to auxiliary movement means for two-wheeled hand trucks; and the principal concepts of the present invention provide auxiliary wheels for the hand truck, which advantageously provides that the hand truck may be rolled laterally or transversely of its usual direction. This provides particular advantages when the load object being carried is relatively wide; for with two-wheeled trucks not provided with the present invention, the truck and its load must be turned 90° to achieve a full right-angle change of direction. This, however, often provides disadvantages of material handling; and, it renders it effectively impossible to roll a two-wheeled truck through a relatively narrow doorway or passageway, if the load-object happens to be relatively wide.

Other concepts provide that the auxiliary wheels are mounted for movement between a retracted position and an operative position; and thus the hand truck may be utilized in its conventional manner, without objectionable inconvenience due to the presence of the auxiliary wheels, unless and until the situation arises during which the user desires to utilize the auxiliary wheels for the lateral or transverse movement indicated above.

The above description is quite introductory and of a general nature; and the above and further concepts, and other details and features of the invention, will be further apparent in the following description of an illustrative embodiment for disclosing the inventive concepts, taken in conjunction with the accompanying somewhat diagrammatic and schematic drawing, and in which.

Figure 1:
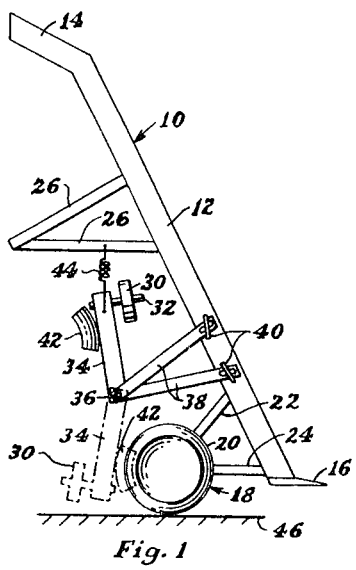
FIG. 1 is an elevational view of a two-wheeled hand truck, having provided thereon an auxiliary wheel means according to the present invention; and the auxiliary wheel means is shown in full lines in a retracted position, and in chain lines in an extended or operational position prior to being engaged onto the supporting floor.

As shown in the drawings, a two-wheeled hand truck 10 is shown generally of conventional construction. That is, it has a frame 12, and at the upper end of the frame 12 there are rearwardly-extending handles 14, while at the lower end of the frame 12 there is a forwardly extending lifting lip or flange 16 adapted to be engaged under the load object to be carried. Adjacent the lower end of the frame 12, there is provided a wheel assembly 18, consisting of a pair of parallel wheels 20 carried by a bracket shown as formed by supporting members 22 and 24. These wheels 20 provide for movement of the hand truck in a plane generally perpendicular to the general plane of the frame 12. At a relatively high position with respect to the frame 12, there is shown as extending rearwardly therefrom a supporting foot or bracket 26 which provides a supporting leg if it is desired to tip the truck rearwardly so far that the frame 12 is generally horizontal.

The two-wheeled truck as described in the above paragraph is of conventional construction, and its features as therein set forth form no part of the present invention, it being described to show the setting or background for the inventive concepts now to be described.

According to the present invention, there are provided auxiliary wheels 30, shown as carried on shafts 32, each supported by a movable support bar or member 34.

The support member 34 is shown as pivoted, as at pivot pin 36, to a bracket 38 mounted to the truck frame 12. As shown, the bracket 38 is formed from two support members, each being joined to the frame as by a connector member 40.

The support bar 34 also is shown as carrying a support shoe 42 which, when the auxiliary wheel assembly is in its extended or operational position, engages the primary truck wheels 20, achieving both a braking and a supporting effect.

As shown, the auxiliary wheel assembly is biased to a retracted (FIG. 1) position by a tension spring 44 which interconnects the support bar 34 and the frame leg 26.

It will be noted that the auxiliary or secondary wheel means 30 is supported in a manner such that each is disposed generally perpendicular to the plane of the primary truck wheels 20.

When the auxiliary wheels 30 are moved into their extended or operational position, and the truck tipped rearwardly a slight amount, it will be noted that the auxiliary wheels 30 then come into supporting engagement with the associated floor(FIG. 2) and the primary truck wheels 20 are out of such engagement with the floor, the floor being indicated diagrammatically by the line 46. Thus the truck 10 may be moved by rolling movement of its auxiliary or secondary wheels 30, in a direction generally perpendicular to that of the plane of the primary truck wheels 20. This transverse direction of movement is indicated in FIGS. 3 by the reference arrows 48.

Figure 2:
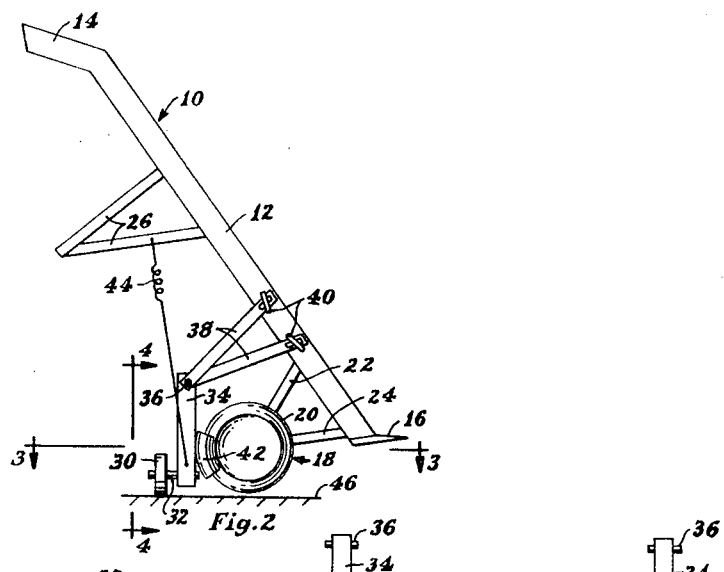
FIG. 2 is an elevational view of the hand truck shown in FIG. 1, but with the auxiliary wheel means now engaging the supporting floor, the truck having been tipped or manipulated so as to effect the engagement of those wheel means and the disengagement of the primary truck wheels, with respect to the associated floor.
Figure 3:
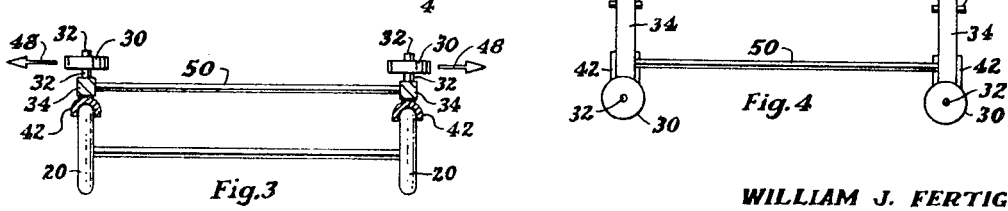
FIG. 3 is a horizontal cross-sectional view of the hand truck and the auxiliary wheel means, this view being taken generally as indicated by section-lines 3—3 of FIG. 2.
Figure 4:
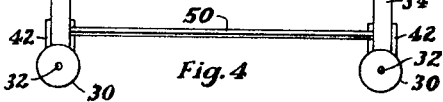
FIG. 4 is a fragmental elevational view of the auxiliary wheel means, taken generally as indicated by view-lines 4—4 of FIG. 2.

(In use, the truck 10 will probably will be tipped slightly more rearwardly than that shown in FIG. 2, achieving even more stability than is there shown, and making more sure that there is an upward component of support from the shoe 42 to the wheel 20.)

In use of the truck 10, when the user desires to utilize the auxiliary wheels 30, he may conveniently push downwardly upon a transverse bar 50 (FIG. 3) which is shown as extending between the support members 34 at each side of the truck 10. He pushes on the support bar 50 an amount sufficient to bring the auxiliary wheel means 30 downwardly to the FIG. 2 position, in which the shoe 42 engages the truck wheel 20 as aforesaid, and then tips or rotates the truck 10 rearwardly as mentioned above. In this rearward tipping movement, the auxiliary wheel comes into engagement with the supporting floor 46, and then subsequent rearward tipping of the truck 10 not only maintains the engagement of the auxiliary wheel 30 with the floor, but causes the primary truck wheels 20 to lift off the floor.

The engagement of the auxiliary wheel shoes 42 with the primary truck wheels 20 provides a dual advantage of rigid support of the auxiliary wheel 30 and a positive braking of the primary truck wheels 20 to avoid slippage. The braking effect is thus seen to be achieved automatically as an incident of the moving of the auxiliary wheels 30 into their operational positions.

It will be seen that the auxiliary wheels 30 are located relatively closely adjacent the primary truck wheels 20; and this provides that only a relatively small truck manipulation is required to achieve a change of truck support, from that of the primary truck wheels 20 to that of the auxiliary wheels 30, and provides a support which is advantageously located with respect to the likely center of gravity of the work load being supported on the truck 12.

Another feature to be observed is that the auxiliary wheels 30 are located with respect to the primary wheels 20 in such a position that the manipulation of the truck 10 required to achieve the aforesaid change of truck support from the wheels 20 to the wheels 30, is movement generally parallel to the plane of the primary truck wheels 20. Thus, the tipping movement required to effect a change of support, as between the wheels 20 and 30, is a tipping movement of the same nature which a user would apply to the truck 10 in his normal handling of a load by the truck.

It is thus seen that the present invention provides an auxiliary movement means for two-wheeled hand trucks, accomplishing the intended objects, including those hereinbefore pointed out and others that are inherent in the invention.

It will be understood that modifications and variations may be effected without departing from the scope of the novel concepts of the present invention. Accordingly, the invention is not to be considered limited to the specific form or arrangements herein described and shown.

I claim:

1. For a hand truck having a frame means and truck wheel means mounted behind and adjacent the lower end of the frame means for facilitating the movement of said hand truck with a load object being supported by said frame means, the plane of said truck wheel means being in and providing for movement of said hand truck in a plane generally perpendicular to the general plane of said frame means and of its supporting engagement with the load object, lateral-movement-facilitating wheel means, said last-named means comprising:

secondary wheel means, and means supporting said secondary wheel means to be disposed generally perpendicular to the plane of the aforesaid truck wheel means;

means providing that the hand truck and its supported load object are supportable by said secondary wheel means, said first-mentioned truck wheel means being then in non-supporting position;

thereby providing that the said hand truck may be moved, by rolling movement of its said secondary wheel means, in a direction generally perpendicular to that of the plane of its first-mentioned truck wheel means;

in a combination in which support means supportingly extend between said truck frame means and said secondary wheel means, and provide for operatively locating said secondary wheel means in a retracted position, in which said secondary wheel means do not supportingly engage the associated supporting floor during movement of said hand truck by the rolling movement of the first-mentioned truck wheel means, and an operational position in which said secondary wheel means may be caused to supportingly engage the associated supporting floor by a manipulation of said hand truck to engage said secondary wheel means supportingly with the associated floor and disengage said first-mentioned truck wheel means from supporting engagement with the floor;

and in which means are provided in supporting association with said secondary wheel means which, when the said secondary wheel means supportingly engage the floor, engages the first-mentioned truck wheel means to partially support said secondary wheel means from the frame means through the said first-mentioned truck wheel means.

2. The invention as set forth in claim 1 in a combination in which means support said secondary wheel means relatively closely adjacent said first-mentioned truck wheel means to provide that only a relatively small truck manipulation is required to achieve a change of truck support, from that of the first-mentioned truck wheel means to that of the said secondary wheel means.

3. The invention as set forth in claim 2 in a combination in which the said secondary wheel means are so located with respect to said first-mentioned truck wheel means in such a position that the truck manipulation required to achieve a change of truck support, from that of the first-mentioned truck wheel means to that of the said secondary wheel means, is movement generally parallel to the plane of the said first-mentioned truck wheel means.

4. The invention as set forth in claim 1 in a combination in which there is a secondary wheel means provided adjacent each side of said hand truck.

5. The invention as set forth in claim 4 in a combination in which, in the said operational position of the said secondary wheel means, the support of each of said secondary wheel means is that it is supportedly connected to said frame partly through an associated one of said first-mentioned truck wheel means and partly by support means apart from said truck wheel means.

6. For a hand truck having a frame means and truck wheel means mounted behind and adjacent the lower end of the frame means for facilitating the movement of said hand truck with a load object being supported by said frame means, the plane of said truck wheel means being in and providing for movement of said hand truck in a plane generally perpendicular to the general plane of said frame means and of its supporting engagement with the load object, lateral-movement-facilitating wheel means, said last-named means comprising:

secondary wheel means, and means supporting said secondary wheel means to be disposed generally perpendicular to the plane of the aforesaid truck wheel means;

means providing that the hand truck and its supported load object are supportable by said secondary wheel means, said first-mentioned truck wheel means being then in non-supporting position;

thereby providing that the said hand truck may be moved, by rolling movement of its said secondary wheel means, in a direction generally perpendicular to that of the plane of its first-mentioned truck wheel means;

in a combination in which support means supportingly extend between said truck frame means and said secondary wheel means, and provide for operatively locating said secondary wheel means in a retracted position, in which said secondary wheel means do not supportingly engage the associated supporting floor during movement of said hand truck by the rolling movement of the first-mentioned truck wheel means, and an operational position in which said secondary wheel means may be caused to supportingly engage the associated supporting floor by a manipulation of said hand truck to engage said secondary wheel means supportingly with the associated floor and disengage said first-mentioned truck wheel means from supporting engagement with the floor, there being means provided which supportingly interact between the secondary wheel means and the first-mentioned truck wheel means to exert a braking effect upon said first-mentioned truck wheel means automatically, as an incident of moving said secondary wheel means to the said operational position.

7. The invention as set forth in claim 6 in a combination in which the said braking means are provided in supporting association with the secondary wheel means in a manner in which, when the truck is manipulated to cause the said secondary wheel means to supportingly engage the floor, not only brakingly but also supportingly engages the first-mentioned truck wheel means to partially support said secondary wheel means from the frame means through the said first-mentioned truck wheel means.

8. The invention as set forth in claim 6 in a combination in which the said secondary wheel means in said operational position are located relatively closely adjacent said first-mentioned truck wheel means to provide that only a relatively small truck manipulation is required to achieve a change of truck support, from that of the first-mentioned truck wheel means to that of the said secondary wheel means.

* * * * *